United States Patent
Stephenson et al.

(10) Patent No.: US 6,724,687 B1
(45) Date of Patent: Apr. 20, 2004

(54) CHARACTERIZING OIL, GAS OR GEOTHERMAL WELLS, INCLUDING FRACTURES THEREOF

(75) Inventors: Stanley V. Stephenson, Duncan, OK (US); John L. Loth, Morgantown, WV (US)

(73) Assignees: Halliburton Energy Services, Inc., Duncan, OK (US); West Virginia University Research Corporation, Morgantown, WV (US)

( * ) Notice: Subject to any disclaimer, the term of this patent is extended or adjusted under 35 U.S.C. 154(b) by 443 days.

(21) Appl. No.: 09/697,621

(22) Filed: Oct. 26, 2000

(51) Int. Cl.$^7$ .............................. G01V 1/40; G01V 1/02
(52) U.S. Cl. ......................... 367/32; 181/103; 175/50; 166/250.1
(58) Field of Search .................. 367/32; 175/40, 175/50; 166/250.1, 250.3, 250.16, 259; 181/103

(56) References Cited

U.S. PATENT DOCUMENTS

| | | | |
|---|---|---|---|
| 3,559,476 A | * 2/1971 | Kuo et al. | 181/103 |
| 4,802,144 A | 1/1989 | Holzhausen et al. | 367/35 |
| 4,858,130 A | * 8/1989 | Widrow | 364/421 |
| 5,081,613 A | * 1/1992 | Holzhausen et al. | 181/105 |
| 5,093,811 A | * 3/1992 | Mellor et al. | 367/35 |
| 5,220,504 A | * 6/1993 | Holzhausen et al. | 364/421 |
| 5,377,104 A | * 12/1994 | Sorrells et al. | 364/421 |

* cited by examiner

*Primary Examiner*—Nelson Moskowitz
(74) *Attorney, Agent, or Firm*—Robert A. Kent; E. Harry Gilbert, III (57) ABSTRACT

An excitation event in an oil, gas or geothermal well creates a responsive signal having lower and higher frequency components, which higher frequency component provides information about one or more characteristics of the well. Examples of such characteristics pertaining to a subterranean fracture include: breakdown pressure at fracture initiation, time it takes proppant to reach and to screenout the tip of the fracture, fracture geometry and fracture growth, fracture closure pressure, relative fluid flow through respective perforations, and horsepower requirements to perform a fracture treatment. One excitation event includes creating an excitation signal having a maximum amplitude change occurring within a time $t_1$, which is less than a period $t_2$ of the higher frequency component. Wavelet processing may be used to separate or distinguish the higher frequency waveform from the lower frequency waveform. The information can be used to control a process (for example, a fracturing process) applied to the respective well or one or more other wells. In another aspect, an unidentified signature waveform is compared to identified signature waveforms in a neural network computer database to create an identity for the unidentified signature waveform relative to an identified signature waveform in the database. A system to determine a characteristic of an oil, gas or geothermal well is also disclosed.

9 Claims, 7 Drawing Sheets

CHARACTERIZING OIL, GAS OR GEOTHERMAL WELLS, INCLUDING FRACTURES THEREOF

BACKGROUND OF THE INVENTION

This invention relates generally to creating and operating oil, gas or geothermal wells and more particularly, but not by way of limitation, to fracturing subterranean formations and determining characterizing information about the fractures, such as for use in monitoring or controlling the fracturing process or in performing subsequent fracturing jobs. This more generally includes determining characteristics of subterranean structures by obtaining and evaluating signals created in the well in response to one or more excitation events. As a specific, but non-limiting example, the present invention can be used to determine geometry (e.g., length, width and height) and events during the creation of fractures in oil or gas-bearing formations.

Characterizing a well during operations relating to creating or operating the well can provide various information about what is downhole in the well or adjacent subterranean formations. This information may be used in performing the operation(s) on the respective well, or it may be useful in planning or conducting operations on other wells. Such information includes, for example, structural information (e.g., what objects are downhole, locations of what is downhole, and events that occur downhole) and parametric information (e.g., pressure, temperature and flow rate).

For example, knowledge of fracture dimensions may permit wells to be drilled in optimal locations to take advantage of non-uniform drainage or injection patterns that hydraulic fractures may produce. In this way it may be possible to extract more of the resources in a field using a smaller number of wells than would be possible if fracture geometry were not known. Furthermore, information about the rate of hydraulic fracture growth can be used in improving the design and production of the fractures, thereby resulting in economic savings to the individuals and organizations who use hydraulic fractures in their operations.

Well characterization encompasses a wide range of technologies. One is well logging prior to installing casing. Sonar, with piezoelectric pressure signal generators operating in the audible frequency range, may be used. Sonar technology is expensive, time consuming, and relies on extensive software to interpret the reflected wave pattern.

After casing is cemented in place, well characterization typically includes techniques based on pressure/time transient analysis. In these, steady state is established, such as by making the well produce, capping it off, or by pumping fluid into the well; and then, for example, a well outlet valve at the surface is manually opened or closed at a normal speed. This starts a gradual change in well pressure, slow enough that it can be read from gauges in intervals of seconds to an hour or more. The reason for the pressure transient slowness is that the Darcy Law for fluid seepage governs it. Pressure/time data and their derivatives are graphed on semi-log and log-log coordinates. The uniqueness of these slopes provides sufficient information to estimate well productivity, formation permeability, and reservoir geometry. These tests are performed without pulsatile flow present; therefore, the data have a high signal to noise ratio.

During well servicing such as in a fracturing process, pumps requiring thousands of horsepower are in operation. Pumping rate and treating pressure are operational constraints for a number of reasons. Injecting at too high a rate and thus pressure has the potential for fracturing out of the productive zone. The rate may also be limited because some fluids degrade under high shear rate. Another reason to limit the injection pressure may be tubular structure or available pump horsepower. However, high pumping rate is desirable to achieve high fluid efficiency, defined as the ratio of fracture volume created to the fluid volume pumped.

To collect well-defined pressure/time data during pumping, one must work with strong pressure signals. At high pumping rates, velocities may reach up to 40 feet/second in the flow passages. Transient fluid flow changes make a significant impact on the local friction pressure drop. Fracturing jobs often start with a "mini-frac" test. To do this, the pump speed is suddenly reduced (e.g., from 15 to 10 barrels/minute). The result is a sinusoidal pressure transient from which fluid efficiency, near well damage, and minimum in situ stress can be calculated.

Fracture size is another desirable characteristic to know. This has previously been obtained using conventional hydraulic impedance testing. In conventional hydraulic impedance testing, a relatively short duration pulse is produced at the surface and then the reflected signal is observed for one peak indicating the mouth of the fracture and another, smaller peak indicating the tip of the fracture. The time between the peaks is indicative of the fracture length and with an assumed volume and fracture profile, either the height or width can be determined. A shortcoming of this technique is that it is usually done in a static fluid condition due to large amounts of noise from pumps hiding the smaller reflected peak. The time frame for the pulse is typically longer than the travel time for the wave into and out of the fracture (especially at the start of the fracture stimulation process when the fracture is relatively short), which further smears, degrades or masks the signal of interest.

Other fracturing characteristics that are desirable to know and have been determinable include breakdown pressure when the fracture begins, screenout when proppant in the fracturing fluid reaches the tip of the fracture and plugs it off, and fracture closure pressure that exists after the fracture has partially closed when the fracturing pressure is released. These have been interpolated from various pressure versus time curves. For example, screenout has been deemed to exist at the beginning of a segment having a 1:1 ratio (slope of 1) in a curve representing the square root of pressure versus the square root of time; and fracture closure pressure has been interpolated from a pressure versus square root of time plot by drawing two tangential lines to the curve and at their point of intersection taking that pressure as the fracture closure pressure.

There is the need to obtain such information as mentioned above more directly if possible rather than having to infer it as in the current state of the art.

SUMMARY OF THE INVENTION

The present invention overcomes the above-noted and other shortcomings of the prior art, and meets the aforementioned needs, by providing a novel and improved well characterizing method and system and a novel and improved fracturing method.

The present invention uses an excitation event that creates a responsive signal having lower and higher frequency components, which higher frequency component provides information about one or more characteristics of the well. For example, the present invention can be used to obtain or measure signatures of hydraulic fractures from pressure signals. In a particular application, the invention uses a dynamic pressure response during a fracture stimulation job, which response undergoes signal decomposition by the use of wavelet processing to measure the response. In one use, a pulse whose rise or fall time is shorter than the travel time in the fracture excites the fracture at its natural, or resonant, frequency. For example, a flow rate change in the form of a step function or square wave, with rise and fall times measured in milliseconds, induces the type of flow transient needed to excite a natural acoustic frequency inside the fracture. The wave reflected back through the casing perforations contains the acoustic signature of the fracture. This results in a higher frequency wave being modulated on the wellbore's resonant lower frequency wave. The higher frequency wave provides additional information (e.g., fracture geometry, such as fracture length) about the well. Non-limiting examples of other determinable information pertaining to a subterranean fracture include: breakdown pressure at fracture initiation, the time it takes proppant to reach and to screenout the tip of the fracture, fracture growth, fracture closure pressure, relative fluid flow through respective perforations, and horsepower requirements to perform a fracture treatment. This invention allows monitoring and adjusting of the fracturing process in real time for better treatment execution.

Accordingly, the present invention provides a method of determining a characteristic of an oil, gas or geothermal well, comprising: detecting a higher frequency signal on a lower frequency signal obtained from an oil, gas or geothermal well in response to an excitation event; and using the higher frequency signal to determine a characteristic of the well.

The invention can also be broadly defined as a method of characterizing an oil, gas or geothermal well, comprising: creating in an oil, gas or geothermal well an excitation signal having a maximum amplitude change occurring within a time $t_1$; and obtaining a frequency response from the well resulting from the excitation signal, wherein the frequency response includes a period of $t_2$, and wherein $t_1$ is less than $t_2$.

Still another definition is as a method of determining a characteristic of a subterranean fracture extending from a wellbore of an oil, gas or geothermal well, comprising: detecting pressure in a fluid in the well and generating an electric signal in response; applying wavelet processing to waveforms of the electric signal to separate a higher frequency waveform from a lower frequency waveform; and determining a characteristic of the subterranean fracture from the higher frequency waveform.

Fracturing is an aspect of a particular implementation of the invention and so the invention can also be defined as a method of fracturing in a subterranean formation traversed by a wellbore, comprising: pumping fluid under pressure into an oil, gas or geothermal well to fracture a subterranean formation traversed by a wellbore of the well and to create an excitation event; detecting pressure in the fluid responsive to the excitation event and generating an electric signal in response; applying wavelet processing to waveforms of the electric signal to separate a higher frequency waveform from a lower frequency waveform; and determining a characteristic of the subterranean fracture from the higher frequency waveform. Such method may further comprise repeating the steps of pumping, detecting, applying, and determining to enlarge the fracture and to provide changes in the determined characteristic corresponding to and indicating changes in the enlarging fracture. In one implementation, determining a characteristic includes: computing a speed of sound in response to a length along the wellbore and the lower frequency waveform; and computing a length of the fracture in response to the speed of sound and the higher frequency waveform; and such method further comprises controlling the pumping of the fluid in response to the lengths computed during repeated determining steps. More generally, the definitions of the invention also can include providing control in response to the one or more determined characteristics.

The present invention also provides a method of characterizing a fracture in an oil, gas or geothermal well, comprising maintaining in a neural network computer a database of identified signature waveforms. This method further comprises inputting into the neural network computer an unidentified signature waveform from an oil, gas or geothermal well obtained using steps of: detecting pressure in a fluid in such well and generating an electric signal in response; and applying wavelet processing to waveforms of the electric signal for such other well. This method still further comprises processing the unidentified signature waveform in the neural network computer, including comparing the unidentified signature waveform to identified signature waveforms in the database, to create an identity for the unidentified signature waveform relative to an identified signature waveform in the database.

The present invention still further provides a system to determine a characteristic of an oil, gas or geothermal well, comprising: a signal sensor to sense a response in the well to an excitation event; a signal processor connected to the signal sensor, the signal processor including a computer programmed for wavelet processing such that the computer performs wavelet processing of waveforms in a response sensed by the signal sensor; and a display connected to the signal processor to output data identifying a characteristic of the well from the wavelet processed waveforms. In a particular implementation, the system further comprises an excitation signal generator to provide an excitation signal in the oil, gas or geothermal well as the excitation event.

Therefore, from the foregoing, it is a general object of the present invention to provide a novel and improved well characterizing method and system and a novel and improved fracturing method. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 6 shows graphs of two different wavelet decomposed waveforms used for determining when proppant initially reaches the fracture tip and when screenout occurs.

FIG. 9 is a block diagram of a neural network system for use in performing a method of the present invention.

DETAILED DESCRIPTION OF THE INVENTION

To determine a characteristic of an oil, gas or geothermal well, a method of the present invention comprises detecting a higher frequency signal on a lower frequency signal obtained from an oil, gas or geothermal well in response to an excitation event and using the higher frequency signal to determine a (i.e., at least one) characteristic of the well. The higher frequency signal has one or more discernible features that relate to the one or more characteristics of the well.

The present invention can be applied to any suitable event that produces such higher frequency signal and that can be correlated with one or more characteristics of the well. Such characteristics might include, but are not limited to, structural features (e.g., identifiable objects, geometric information, size, or movement) and conditions or parametric information (e.g., pressure). Knowledge of fracture size, for example, can help to increase accuracy of production calculations based on the size. Knowledge of fracture growth or movement, for example, can be used to help predict if and when a tip screenout will occur.

Although it is contemplated that the present invention has broader application, it will be further described with reference to fracturing an oil, gas or geothermal well and to pressure signals occurring during such a process. That is, the higher frequency signal referred to above is a pressure signal in the following examples, and it is particularly a pressure signal responsive to a (i.e., at least one) fracture extending from a wellbore of the well. In this particular context, the present invention can be defined as a method of determining a characteristic of a subterranean fracture extending from a wellbore of an oil, gas or geothermal well comprising: detecting pressure in a fluid in the well and generating an electric signal in response; applying wavelet processing to waveforms of the electric signal to separate a higher frequency waveform from a lower frequency waveform; and determining a characteristic of the subterranean fracture from the higher frequency waveform. This can be used in a method of fracturing a subterranean formation traversed by the wellbore in accordance with the present invention, which fracturing method further comprises pumping fluid under pressure into the well to fracture a subterranean formation traversed by the wellbore and to create an excitation event.

Figures 1, 1A:
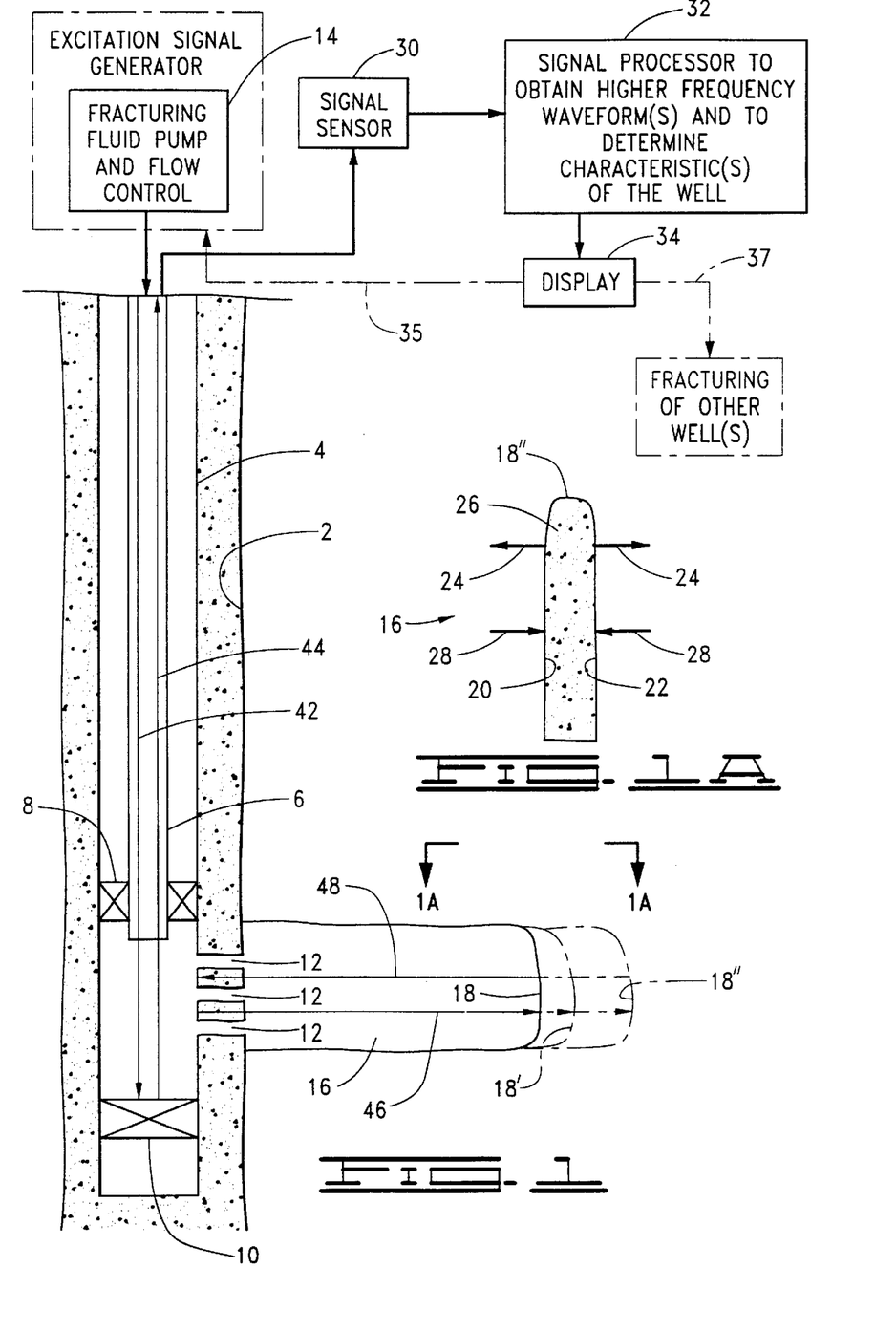
FIG. 1 is a schematic and block diagram of a system of the present invention.
FIG. 1A is a schematic illustration of part of a fracture taken along line 1A—1A in FIG. 1.

Referring to FIG. 1, the fracturing and other aspects of the present invention are performed with regard to an oil, gas or geothermal well having a lined or unlined/cased or uncased wellbore 2 (in this illustration, being cased with casing 4 lowered and cemented in the wellbore in known manner) having been suitably prepared for a fracturing job as known in the art. A tubing string 6 is also suitably installed to provide a conduit through which the fracturing fluid is to be pumped and pressure maintained on the formation to be fractured. Packer 8 is suitably installed in known manner in the annulus between the casing 4 and the tubing string 6 at the top of the zone to be fractured. Although the illustrated tubing string 6 has a lower end shown just below the packer 8, the effective length continues to a lower termination, which in the FIG. 1 illustration includes a packer 10 disposed in known manner in the casing 4 below or at the bottom (as oriented in FIG. 1) of the zone to be fractured. Termination typically ends either in conjunction with the bottom of the wellbore 2 or at some type of closure device, such as the illustrated packer 10.

Perforations 12 are formed in the casing 4 and the adjacent cement in a suitable known manner in preparation for the fracturing job. The perforations 12 provide openings from the casing 4 through the cement into the adjacent formation. The fracturing fluid flows out the perforations 12 from a fracturing fluid source at the surface, which source is connected to a fracturing fluid pump and flow control circuit 14 of conventional type. The fracturing fluid pump and flow control 14 includes in one embodiment suitable equipment for providing an excitation signal described below. Such equipment typically includes known types of fracturing fluid pumps, choke and valve devices, and pump speed control devices. The fracturing fluid pump and flow control circuit 14 pumps fracturing fluid under pressure into the oil, gas or geothermal well to fracture a subterranean formation and, particularly with regard to the present invention, to create an excitation event (the foregoing is not limiting of broader aspects of the invention because other techniques can be used to create an excitation signal; as one non-limiting example, an on-off addition of a stream of water into the pumped fracturing fluid to induce an adequate acoustic signal (or signals) at the desired frequency (or frequencies), as provided for example by a software driven flow modulation device; furthermore, an excitation signal may be caused within the structure itself, such as by fracture closure).

During a fracturing process, which may be conducted in a conventional known manner other than as described below in accordance with the present invention, the fracturing fluid is pumped down the tubing string 6 and out the perforations 12 to hydraulically fracture the adjacent subterranean formation. As illustrated in FIG. 1, a fracture 16 has been started and extended to a tip 18. The fracture can continue to be extended, such as illustrated by successive fracture tips 18' and 18".

Referring to FIG. 1A, as the fracture length is extended as illustrated in FIG. 1, the fracture width may also change. In FIG. 1A it is assumed that the fracture length has stopped at tip 18". Up to at least this point, laterally outward pressure has been applied by the pressurized fluid from the pump(s) of the circuit 14 against facing fracture surfaces 20, 22 as indicated by arrows 24, thereby forcing and holding them apart.

By the time a desired fracture length is obtained, proppant 26 is typically placed in the fracture following the leading edge of the fracturing fluid creating the fracture. When the fracturing process is stopped by stopping the one or more pumps in the fracturing fluid pump and flow control circuit 14, the laterally outwardly applied pressure is released and the surfaces 20, 22 at least partially close toward each other in the direction indicated by arrows 28 in FIG. 1A. Complete closure is prevented by the volume of proppant 26 placed in the fracture.

During the fracturing process, various significant events occur. These include initiating the fracture when a sufficient breakdown pressure is achieved to start the fracture from the wall of the wellbore 2; lengthening of the fracture; proppant first reaching the tip of the fracture; proppant packing against the fracture tip to cause a screenout; and closing of the fracture once fracturing pressure is removed. Each of these events can be identified by the present invention.

To determine the foregoing events or conditions, which are included in the one or more characteristics of the well that can be determined by the present invention, a system of the present invention includes, in addition to any excitation signal generator that may be needed, a signal sensor 30, a signal processor 32 to obtain higher frequency waveform(s) and to determine characteristic(s) of the well, and a display 34 as represented in FIG. 1.

The signal sensor 30 senses a response in the well to an excitation event, particular examples of such an event being given below. In a particular implementation, the signal sensor 30 is preferably a high frequency response pressure sensor with adequate frequency response range and accuracy suitable for digital data collection; such sensors are known in the art. It is preferable to locate the signal sensor 30 (there can be one or more of them) downhole; however, present technology may not always be feasible for a downhole location. For example, a suitable sensor can be lowered into the well on an armored cable; however, this is expensive. A downhole gauge can be used; however, this does not permit real-time analysis. Thus, the signal sensor 30 is shown at the surface, but it can be located downhole.

Figure 2:
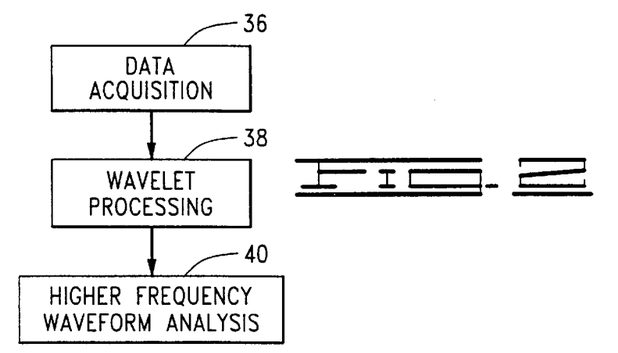
FIG. 2 is a block diagram of program elements in a computer implementation of a signal processor shown in FIG. 1.

The signal processor 32 can be implemented by a suitable computer. A non-limiting example of such a computer is a Pentium II, 400-MHz based personal computer having a 128-Meg RAM. Referring to FIG. 2, the computer is programmed with a (i.e., at least one) data acquisition program 36, wavelet processing program 38 and higher frequency waveform analysis program 40.

The program 36 needs to provide fast enough data acquisition to acquire an adequate response signal which includes at least a first frequency signal and a second frequency signal with one superposed on the other. In the particular illustration, this includes a higher frequency pressure signal in superposition with a lower frequency pressure signal. Suitable data acquisition is obtained in a particular implementation using Iotech WAVEBOOK 516 data acquisition hardware with its software loaded in the aforementioned computer.

Wavelet processing program 38 is used to decompose the acquired pressure signal response into the fundamental frequencies or waveforms, including at least the aforementioned lower and higher frequency waveforms. That is, the wavelet processing program 38 enables the programmed computer of the signal processor 32 to digitally separate an electrical representation of the higher frequency signal from an electrical representation of the lower frequency signal. These representations are digitally encoded in the computer via the data acquisition program 36. In one particular implementation, wavelet processing can be performed by using Matlab WAVELET TOOLBOX wavelet processing software in the aforementioned computer. This software includes particular wavelet processing algorithms, and two particular wavelets used in the following examples are the Daubechies No. 1 wavelet and the Daubechies No. 10 wavelet.

The higher frequency waveform analysis program 40 includes any suitable software for determining the period or frequency of at least the separated higher frequency waveforms. For example, zero crossings can be determined to obtain the waveform's period or Fourier analysis can be used to obtain its frequency, both in known manner.

The display 34 can be any suitable type receptive of direct or indirect communication from the signal processor 32. It can include, for example, a monitor of the aforementioned computer, a printer or other hard copy output device connected to such computer, or a device remotely communicated with such computer. More generally, the display includes whatever may be used to convey the characterizing information determined by the present invention to a human or a machine for subsequent use.

The information provided via the display 34 may be used in controlling the then current fracturing process or one or more other fracturing jobs, as indicated by reference numerals 35 and 37, respectively, in FIG. 1. For example, knowledge of the true size and structure of the fracture allows fracture design software to be optimized to the true conditions instead of often misinterpreted conditions. This leads to designs that more economically increase well production. Data can be used in real time to adjust the job rate and proppant concentration to get the desired results instead of just completing a treatment according to a fixed schedule.

Thus, the present invention provides a system to determine a characteristic of an oil, gas or geothermal well. The system comprises a signal sensor (e.g., signal sensor 30) to sense a response in the well to an excitation event. It also comprises a signal processor (e.g., signal processor 32) connected to the signal sensor, wherein the signal sensor includes a computer programmed for wavelet processing such that the computer performs wavelet processing of waveforms in a response sensed by the signal sensor. The system also includes a display (e.g., display 34) connected to the signal processor to output data identifying a characteristic of the well from the wavelet processed waveforms. As will become apparent below, the system can respond to a naturally occurring excitation event; however, the system can also include an excitation signal generator to provide an excitation signal in the oil, gas or geothermal well as the excitation event. In this latter case, the excitation signal generator includes means for creating a pressure change in fluid in the well such that the pressure change occurs within a time $t_1$ which is less than a time $t_2$, wherein time $t_2$ is a period of the higher frequency waveform forming part of a pressure response to the created pressure change occurring within time to. Such excitation signal generator and means can be implemented by the fracturing fluid pump and flow control circuit 14 as apparent from the following example referring to FIGS. 3–4.

The aforementioned system can be used to create an excitation event which will be described with reference to FIGS. 3–4. This excitation event is an input excitation signal that creates reflected signal responses. The excitation signal in the preferred embodiment is created as a pressure change in the fracturing fluid pumped in the well using the fracturing fluid pump and flow control circuit 14. For example, a step change in flow rate can be used or the flow rate can be shut down altogether. The former may be implemented by using a choke and control valve or by changing the pump speed (assuming the pump speed can be changed quickly enough as needed to provide a suitable excitation signal as explained further below). Shutdown can be obtained by closing a valve or stopping the pumping. Other suitable excitation signals might be used, such as a variable frequency burst sine wave from which resonant responses are created.

Assuming a simple step flow rate change, a pressure wave is thereby created in the fluid. This pressure wave travels the length of the well (as defined by whatever bottomhole termination point is defined) and is reflected from that point back to where it is sensed by the signal sensor 30. If the input and output of the pressure wave are both at the mouth of the well, a linear definition of this flow path is illustrated by lines 42, 44 in FIG. 1. Travel along flow paths 42, 44 produces a relatively low (hereinafter referred to as "lower") frequency signal which is primarily influenced by the length of this path but is also somewhat influenced by the size of the fracture. In previous processes, this lower frequency signal has been detected at a relatively slow sample rate, one example of which is illustrated in FIG. 3A. The present invention, however, is able to create and detect a higher frequency signal riding on the lower frequency waveform. This occurs if the excitation signal is short enough and the sensor sampling rate is fast enough. A resulting combined detected waveform contains superposed waveforms, one example of which is shown in FIG. 3 (which in this example is a faster sampled version of the signal of FIG. 3A). In this example, this higher frequency signal superposed on the lower frequency signal is principally responsive to the size of the fracture and may be used to determine, for example, the length of the fracture. This is related to the signal travel path illustrated by lines 46, 48 in FIG. 1.

Figure 3:
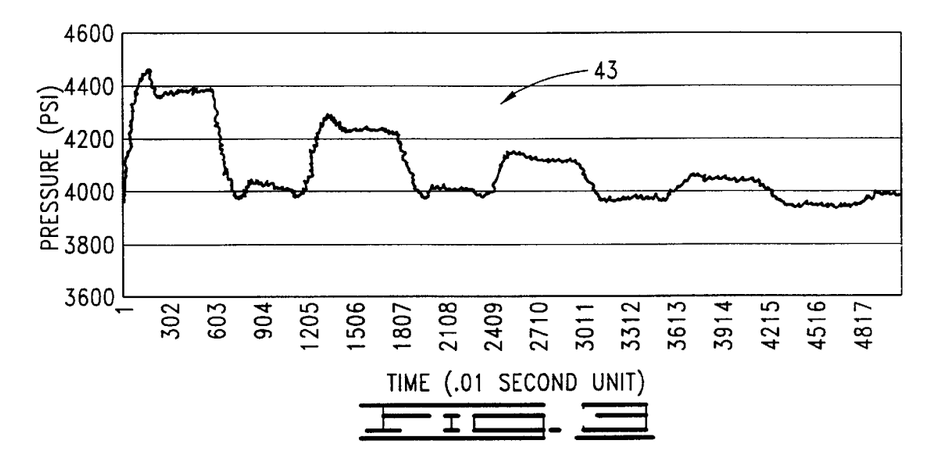
FIG. 3 is a graph of a pressure response obtained in accordance with the present invention.
Figure 3A:
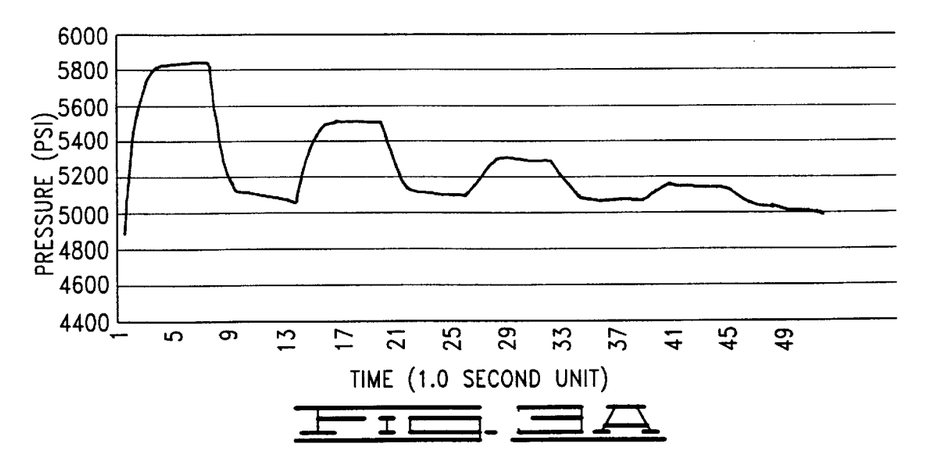
FIG. 3A is a graph of the pressure response which does not show a higher frequency component as shown in FIG. 3.
Figure 4:
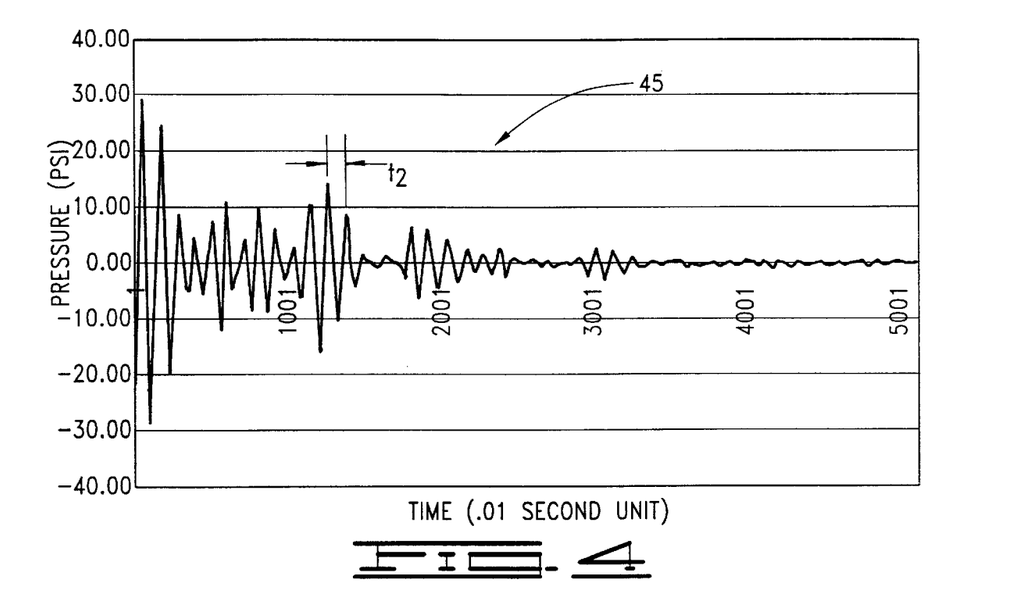
FIG. 4 is a graph of a wavelet decomposed higher frequency waveform from the composite waveform shown in FIG. 3 for use in determining fracture length.

In the example of FIGS. 3 and 4, the excitation signal comes from the sudden shutdown of the last pump at the end of the fracturing job (other non-limiting examples include dropping a gear on one of the pumps or running it in first gear and completely dropping it offline or closing a flow control valve). After a sufficient measurement time, the pump can be slowly brought back online and the process repeated.

As other examples, a rapid flow transient can conveniently be induced in one of three locations: at the inlet of the pump flow supply tube, by suddenly closing an inlet valve whereby the inlet flow rate is reduced to zero; at the outlet of the pump supply tube, by suddenly closing an outlet valve whereby the outlet flow rate is reduced to zero; at the top of the casing, after first opening a valve long enough to establish a steady outflow rate such valve is suddenly closed to reduce its flow rate to zero. The responsive pressure/time data can be collected at these same three locations, for example. Valves for achieving rapid enough transitions are commercially available (e.g., commercial two-inch solenoid valves are available with closing times less than ten milliseconds).

As another example, a flow transient can be created by using a rapidly moving pressurized piston/cylinder combination. The piston can be stroked forward for a sudden increasing pressure pulse or stroked inward for a sudden decreasing pressure pulse.

A result of shutdown is a water hammer like wave approaching a square wave. For an externally input excitation signal, such a step function like flow transient appears to be essential to detect a clear characteristic signature of the fracture in accordance with the present invention. Such step function may be generated at any suitable location outside or inside the well.

For this example responsive signal 43 detected by the signal sensor 30 is shown in FIG. 3, and it includes the higher frequency component riding on the lower frequency waveform. Such pressure/time data must be collected at a high rate for a period of at least two seconds after wave initiation. The higher frequency waveform is separated via the wavelet processing program 38 and results in this example in waveform 45 of FIG. 4. The waveform 45 has a period $t_2$ such as illustrated in FIG. 4.

The length of the fracture 16 from which the signal 43 is obtained can be determined by using at least the higher frequency waveform 45 but preferably both signals are used if the speed of sound in the fluid is not otherwise known. In one example, assume that the lower frequency waveform has a frequency of 0.1 hertz, and thus a period of ten seconds. In this example, assume the length 42 or 44 in the well is 14,000 feet. Because the lower frequency waveform is responsive primarily to this travel distance, the average speed of sound in the fluid is computed as 28,000 feet/10 seconds (the total roundtrip travel distance divided by the period, or travel time, of the responsive signal) which equals 2,800 feet per second. Now knowing the speed of sound for the particular wellbore fluid, and using the time period $t_2$ of the higher frequency waveform (in this example, assume $t_2$ ($1^{1/2}$) second for a frequency of 1.2 hertz for the higher frequency waveform), the fracture length can be calculated: 2 x fracture length (i.e., the round-trip distance into and out of the fracture) speed of sound x higher frequency waveform time period=(2,800 feet per second x ($1^{1/2}$) second) 2,333 feet. The fracture length is one-half this, or 1,167 feet.

To get the foregoing result, the duration of the exciting pressure change in the excitation signal should be less than the period of the higher frequency signal used to determine the characteristic of the well. Thus, $t_1$, the duration of the excitation signal, is less than $t_2$, the period of the responsive higher frequency signal, and thus the duration of the excitation signal is shorter than the fracture roundtrip travel time of the response sensed by the signal sensor 30. In view of the foregoing, a $t_1$ to be used in a particular application depends on the speed of sound in the fluid and the length of the fracture being measured when used as in the above example. Typically, however, $t_1$ is within a range of about 0.001 second to about 0.1 second. The magnitude of the excitation signal is sufficient to get an acceptable signal-to-noise ratio in the responsive waveform sensed by the signal sensor 30. Non-limiting examples include a one to two barrel per second flow rate change creating a pressure differential of at least about 50 pounds per square inch. It is presently believed essential that the step function creates a change in velocity of more than one foot/second to get a reasonable signal to noise ratio. Such a short duration transition excites odd harmonics which produce a square wave shape in the lower frequency waveform, which itself has shorter transition times at its edges than a more slowly transitioning signal such as a sine wave.

In the foregoing example, the excitation event is externally generated as an input signal having a maximum amplitude change occurring within a time period shorter than a time period of the detected higher frequency signal. Such input signal in this example is specifically obtained by creating a pressure change in a fluid in the well. Also in the foregoing example, the responsive signal detected by the signal sensor 30 and processed by the signal processor 32 includes a pressure signal in the fluid having a frequency responsive to a length of the well, and it also includes a pressure signal in the fluid having a frequency responsive to a fracture extending from a wellbore of the well. These two signals are superposed when they are sensed by the signal sensor 30, but they are decomposed or otherwise distinguished as respective frequency components through operation of the signal processor 32. The characteristic determined by the processor 32, such as the length of the fracture, is output through the display 34. The detected fracture length can be monitored to, for example, determine when the fracture growth stops to calculate time remaining before tip screenout.

Accordingly, another definition of the present invention as determining a characteristic of an oil, gas or geothermal well comprises creating in the oil, gas or geothermal well an excitation signal having a maximum amplitude change occurring within a time to and detecting a frequency response in the well resulting from the excitation signal, wherein the frequency response includes a period of $t_2$ and wherein $t_1$ is less than $t_2$. This further comprises using the detected frequency response to determine a characteristic of the subterranean transmission path from which the frequency response is detected. In this particular example, determining a characteristic includes computing a speed of sound in response to a length along the wellbore and a lower frequency waveform, and computing a length of the fracture in response to the speed of sound and the higher frequency waveform.

Rather than responding directly to an excitation signal input into the well as in the foregoing example, the present invention can respond to an excitation event that occurs within the well (which event may, however, be triggered as a result of controlling the circuit 14, for example). That is, the invention can correlate a distinctive change in the higher frequency waveform with the occurrence of a physical event of the fracture. Some examples of this will be given next.

Figure 5:
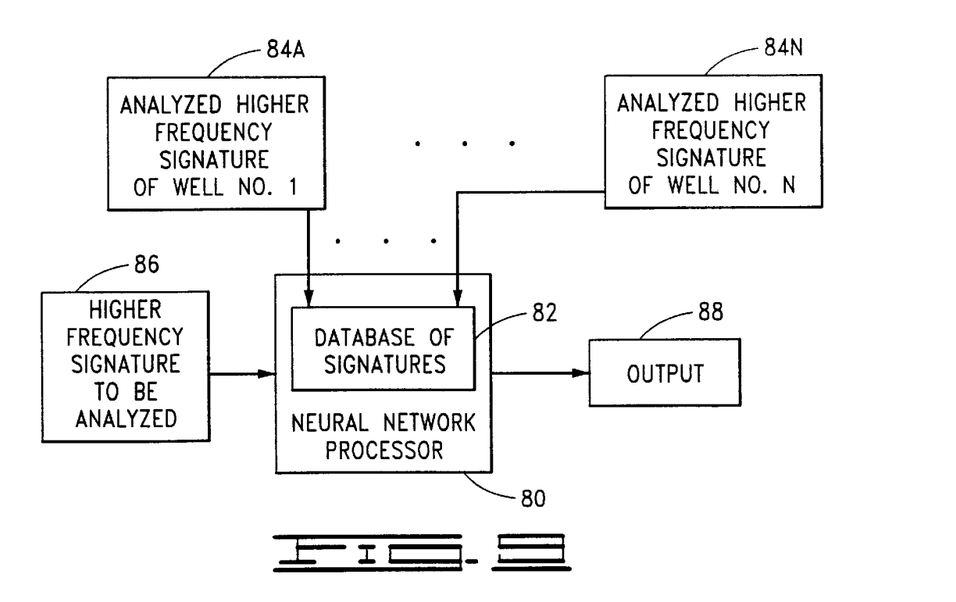
FIG. 5 shows graphs of a signal s and wavelet decomposed waveforms a1 and d1 for use in determining breakdown pressure.

Referring to FIG. 5, another example of an excitation event and the method of the present invention will be described. In this example the excitation event includes initiating a fracture in the well by achieving a breakdown pressure, which can be accomplished by performing a conventional fracturing operation. The characteristic determined in this case is the breakdown pressure. In FIG. 5, signal "s" (50) is the composite pressure signal detected by the signal sensor 30. Using the signal processor 32, this is decomposed into the waveform approximation "a1" (52) that results when the higher frequency waveform "d1" (54) is removed from the original signal "s" (50).

All three of the signals indicate the commencement of pumping at about 500 seconds. This is apparent from the increasing pressure of composite signals (50) and approximation signal a1 (52) and by the increased noise of signal d1 (54). The upper two graphs show increasing pressure and the bottom graph shows continuing noise until the noise abates at the point where a vertical line 56 has been drawn through all three graphs in FIG. 5. The noise abatement occurs because of the sudden increase of capacitance in the system when the fracture opens. Breakdown as indicated by signal d1 (54) at a time indicated by line 56 maps to a pressure as indicated at the corresponding time in the graphs of signals s (50) or a1 (52). Prior to breakdown, the noise level is high on signal d1 (54) due to pumping into a fixed volume at increasing compressional pressures. When breakdown occurs, the fracture opens and the resulting increase of capacitance damps the pressure pulsations from the fracturing fluid pump(s).

Subsequent to breakdown, increased noise transients occur (as indicated by reference number 60 in FIG. 5) due to the pumping rate being increased to increase the flow which is needed to accommodate the increasing volume as the fracture opens and extends. A second increased noise region 62 in the graph of signal d1 indicates shutdown of the pumps.

Figure 7:
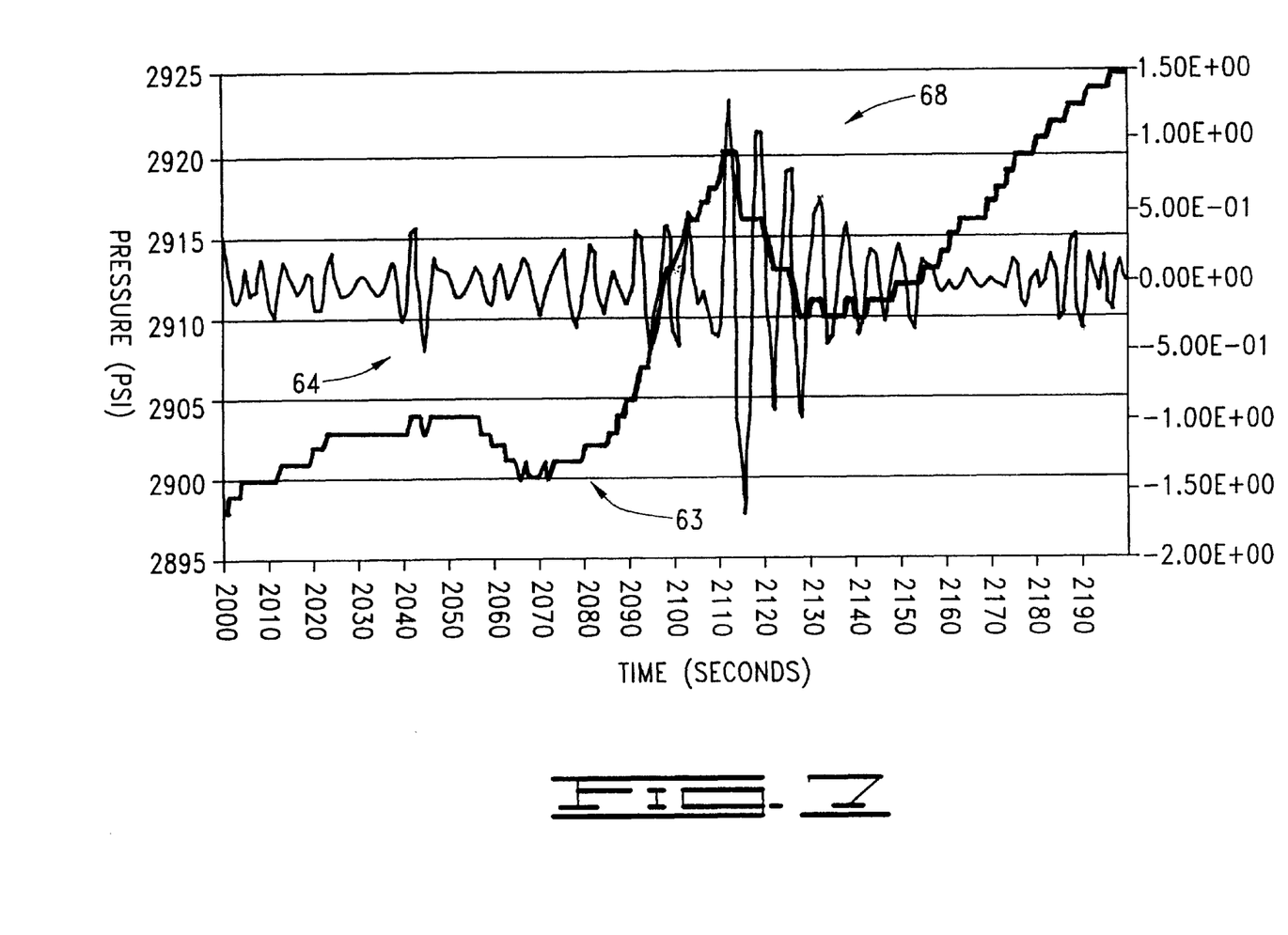
FIG. 7 shows an enlargement of a segment of the upper waveform of FIG. 6.

Still another excitation event and other characteristic determination will next be described with reference to FIGS. 6 and 7. The excitation event here includes proppant reaching a tip of a fracture in the well such that screenout occurs. Also discernible is when proppant first hits the tip of the fracture. These occur during the use of a conventional fracturing process applied to the well.

In FIG. 6, sensed pressure signal 63 (scale on left) is decomposed into upper waveform 64 using the Daubechies No. 10 wavelet and lower waveform 66 using the Daubechies No. 1 wavelet as obtained using the specific implementation of the wavelet processing program 38 mentioned above, as applied to the acquired pressure signal 63 from the signal sensor 30. Referring to the lower waveform 66, screenout (where the proppant has reached the tip of the fracture and plugged it off, which stops further extension of the fracture) is noted by the increased noise, the beginning of which is marked by the vertical line which marks that screenout occurred at 2,345 seconds into the signal. This increased noise and pressure discerned from the higher frequency waveforms indicates that proppant has hit the fracture tip and screenout has occurred whereby no further significant fracture growth occurs.

Also discernible from the higher frequency waveforms 64, 66 in FIG. 6 is an increased noise and pressure event at segments 68, 70 respectively. An enlargement of this portion 68 of the waveform 64 is shown in FIG. 7 (scale on right). The peak of this signal marks the point at which proppant first hits the tip of the fracture whereby pressure and noise increase but where there is still sufficient fluid and pressure to continue to extend the fracture until more proppant arrives and screenout occurs. Therefore, the higher frequency waveforms can be used to determine both proppant initially reaching the fracture tip (e.g., at about 2,110 seconds per FIG. 7) and screenout (e.g., as occurring at 2,345 seconds in FIG. 6).

Figure 8:
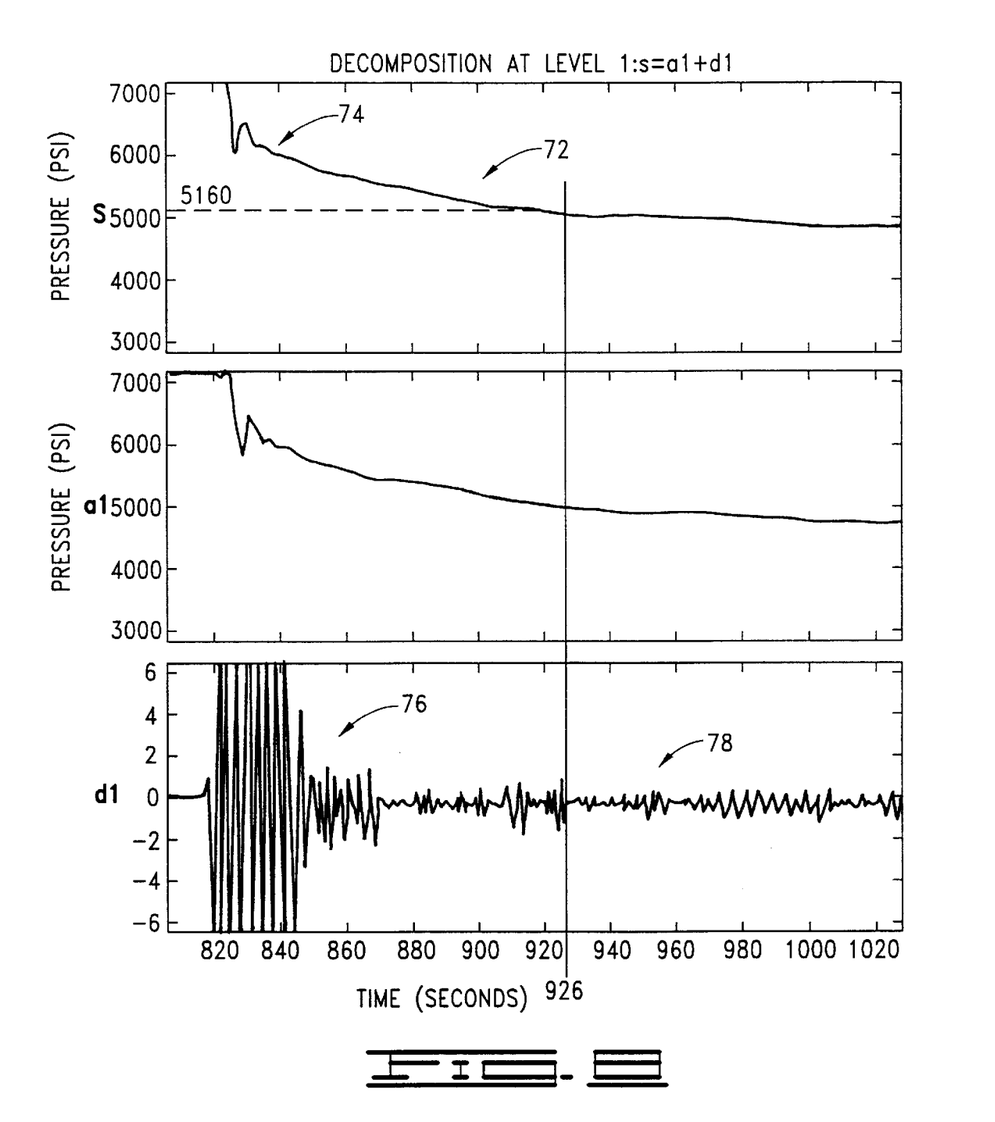
FIG. 8 shows graphs of a signal s and wavelet decomposed waveforms a1 and d1 for use in determining fracture closure pressure.

Referring next to FIG. 8, an example of another excitation event and characteristic determination will be described. In this case, the excitation event includes at least partial closure of the fracture, such as occurs when the fracturing pressure is removed as referred to above with reference to FIG. 1A. Fracture closure occurs, for example, at shutdown of the pumps when the fracturing fluid pressure is released. In response to pump shutdown, the responsive signal detected by the signal sensor 30 indicates pressure decay and water hammer ringing such as illustrated in pressure signal 72 in FIG. 8. The water hammer ringing is evident at segment 74 and the resulting transient noise is clearly visible in segment 76 of decomposed higher frequency waveform 78 in the lower graph of FIG. 8. The physical movement of the surfaces 20, 22 (FIG. 1A) provides a naturally occurring excitation signal producing noise transients up to the vertical line marked on the three graphs of FIG. 8. After this point, the noise is noticeably decreased due to the closed fracture face restricting flow to the wellbore. With the point of closure noted, the vertical line through the three graphs of FIG. 8 marks the same time on each curve and thus the upper two graphs can be used to determine the closure pressure (5,160 pounds per square inch in this example). Thus, the present invention can be used to directly measure closure pressure instead of having to interpolate it from the intersection of two tangential lines on a pressure versus square root of time plot as has been previously done. This enables the calculation of a more accurate net pressure during the job, which is important for designing future treatments or analyzing the current treatment as can readily be appreciated by those skilled in the art.

The foregoing are only examples of various excitation events and characteristic determinations that can be made using the present invention. Other non-limiting examples are the determination of fracture growth (such as by repeating the steps used in creating the fracture and determining the fracture length described above). If there is good acoustic coupling through the perforations, the frequency of one of the higher frequency wavelet decompositions can be used to detect a decrease in frequency as the fracture is growing thereby allowing measurement of the fracture dimensions during a fracturing job. This allows detection of when fracture growth stops and calculation of when screenout will occur.

Another non-limiting example includes determining if a lower horsepower can be used to maintain fracture growth if a pulsating flow is used. This takes advantage of a resonant frequency in the fracture to allow delivery of higher energy directly to the fracture.

Different higher frequency components may be used to measure which of the perforations are taking the majority of the fluid during a step-down test. If the sets of perforations are separated by large enough distances and there is sufficient resolution of the measured pressure, higher frequency waveforms may be associated with the reflections from each set of perforations because there will be slight time delays of multiple waveforms corresponding to the different wave travel times to various perforations.

Another non-limiting example is the use of the wavelet decomposition of pressure and flow signals which allows post-job analysis to determine the cause of unexpected conditions during a fracture treatment. Such may lead to determining what can be done to avoid or take advantage of the unexpected conditions in future jobs and in general to provide a better understanding of the dynamic processes taking place in the fracture.

Still another aspect of the present invention is illustrated in FIG. 9. A neural network processor 80 includes a database 82 of "signatures." Each signature includes one or more of the decomposed higher frequency waveforms characteristic of a particular fracture or type of fracture (e.g., a straight fracture or a multiple fracture). The database 82 is constructed by inputting the obtained and analyzed higher frequency signatures of previously fractured wells as indicated at 84A through 84N in FIG. 9; these can be obtained as described above. They can also be constructed from a computer simulation of various fractures.

For a well to be analyzed, its respective higher frequency signature 86 is obtained in the manner described above and input into the neural network processor 80. The neural network processor 80 uses neural network processing algorithms to obtain a best match between the higher frequency signature 86 and one or more of the signatures in the database 82 to determine a match or closest fit and thereby provide a characterization of the well having the higher frequency signature 86.

Output 88 can be the aforementioned characterization information. It is also contemplated that the neural network processor 80 can be used to provide a real-time output tracking the growth of the fractured geometry during the actual fracturing process.

Thus, the present invention can also be defined as a method of characterizing a fracture in an oil, gas or geothermal well comprising maintaining in a neural network computer a database of identified signature waveforms. These identified signature waveforms can be obtained in any suitable way. Two examples include by way of a simulator simulating a downhole environment or fracturing process, for example, or by way of actual development from a plurality of oil, gas or geothermal wells. In the latter case, each of the identified signature waveforms can be obtained using steps as described above for detecting pressure, applying wavelet processing and determining one or more characteristics of the respective subterranean fracture from the higher frequency waveforms obtained by the wavelet processing. Such method also includes inputting into the neural network computer an unidentified signature waveform from another oil, gas or geothermal well using steps of detecting pressure in a fluid in such other well and generating an electrical signal in response, and applying wavelet processing to waveforms of that electric signal for such other well to separate or otherwise distinguish a higher frequency waveform from a lower frequency waveform for the response from such other well. This method further comprises processing the unidentified signature waveform in the neural network computer, including comparing the unidentified signature waveform to identified signature waveforms in the database to create an identity for the unidentified signature waveform relative to an (i.e., at least one) identified signature waveform in the database. The neural network processing steps referred to above can be implemented in any suitable manner as known to those skilled in the art of signature recognition through the use of neural networks.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A method of determining a characteristic of an oil, gas or geothermal well, comprising:

detecting a higher frequency signal superposed on a lower frequency signal obtained from an oil, gas or geothermal well in response to an excitation event;

generating as the excitation event an input signal having a maximum amplitude change occurring within a time period shorter than a time period of the detected higher frequency signal; and using higher frequency signal to determine a characteristic of the well.

2. A method as defined in claim 1, wherein generating the input signal includes creating a pressure change in a fluid in the well.

3. A method as defined in claim 1, wherein:

the lower frequency signal includes a pressure signal in the fluid having a frequency responsive to a length of the well; and the higher frequency signal includes a pressure signal in the fluid having a frequency responsive to a fracture extending from a wellbore of the well.

4. A method as defined in claim 1, wherein detecting a higher frequency signal on a lower frequency signal includes digitally separating an electrical representation of the higher frequency signal from an electrical representation of the lower frequency signal using wavelet processing.

5. A method of determining a characteristic of an oil, gas or geothermal well, comprising:

detecting a higher frequency signal superposed on a lower frequency signal obtained from an oil, gas or geothermal well in response to an excitation event by digitally separating an electrical representation of the higher frequency signal from an electrical representation of the lower frequency signal using wavelet processing, wherein the higher frequency signal includes a pressure signal responsive to a fracture extending from a wellbore of the well; and using the higher frequency signal to determine a characteristic of the well.

6. A method of determining a characteristic of an oil, gas or geothermal well, comprising:

detecting a higher frequency signal superposed on a lower frequency signal obtained from an oil, gas or geothermal well in response to an excitation event by digitally separating an electrical representation of the higher frequency signal from an electrical representation of the lower frequency signal using wavelet processing; and     using the higher frequency signal to determine a characteristic of the well.

7. A method of determining a characteristic of an oil, gas or geothermal well, comprising:

detecting a higher frequency signal superposed on a lower frequency signal obtained from an oil, gas or geothermal well in response to an excitation event wherein the higher frequency signal is a pressure signal and wherein the excitation event includes pumping a proppant-carrying fluid into the well and proppant therein reaching a tip of a fracture in the well; and     using the higher frequency signal to determine a characteristic of the well.

8. A method of determining a characteristic of an oil, gas or geothermal well, comprising:

detecting a higher frequency signal superposed on a lower frequency signal obtained from an oil, gas or geothermal well in response to an excitation event wherein the excitation event includes pumping a proppant-carrying fluid into the well and proppant therein reaching a tip of a fracture in the well; and     using the higher frequency signal to determine a characteristic of the well.

9. A method of determining a characteristic of an oil, gas or geothermal well, comprising:

detecting a higher frequency signal superposed on a lower frequency signal obtained from an oil, gas or geothermal well in response to an excitation event wherein the excitation event includes at least partially closing a fracture extending from a wellbore of the well; and     using the higher frequency signal to determine a characteristic of the well.

\* \* \* \* \*